UNITED STATES PATENT OFFICE.

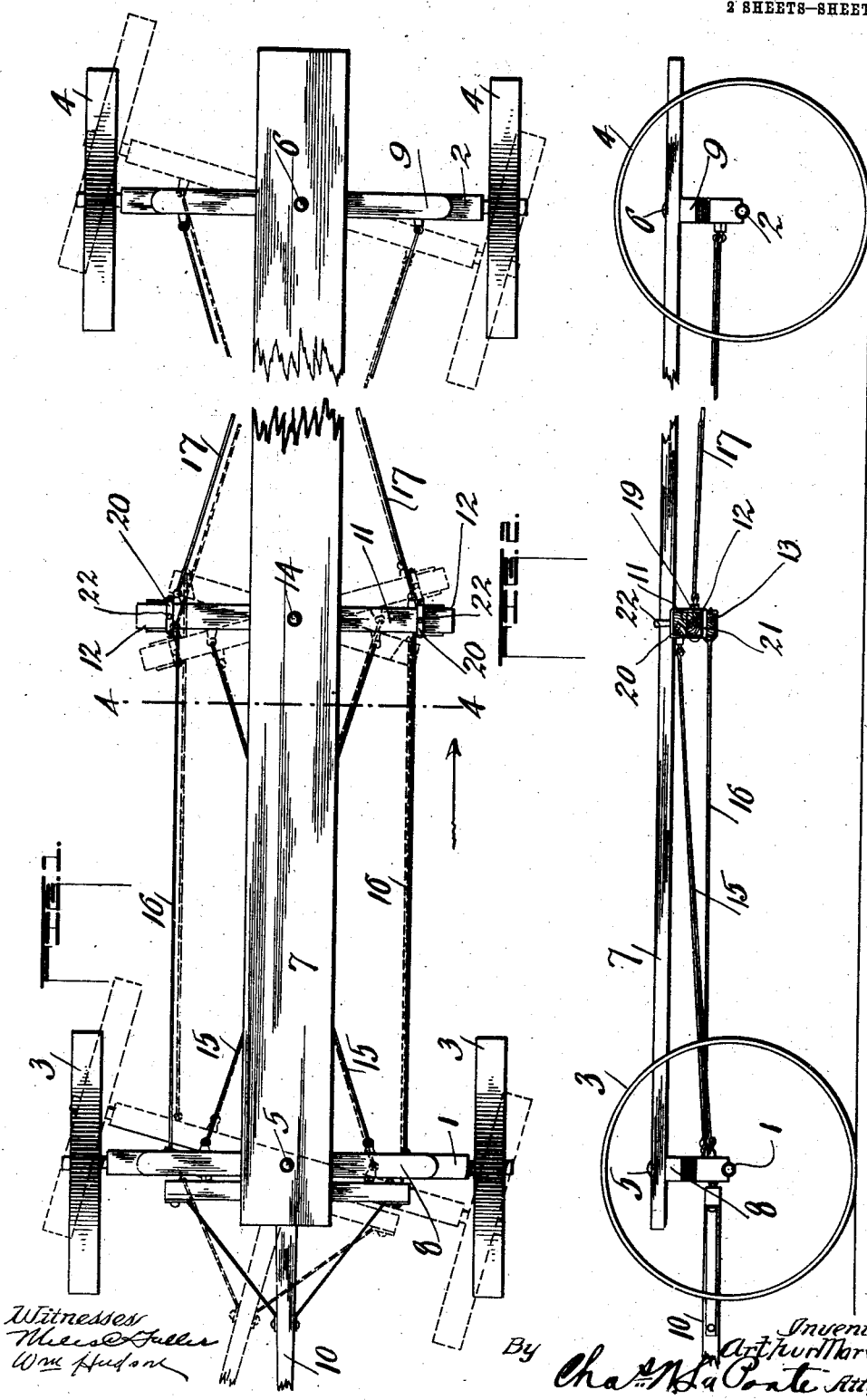

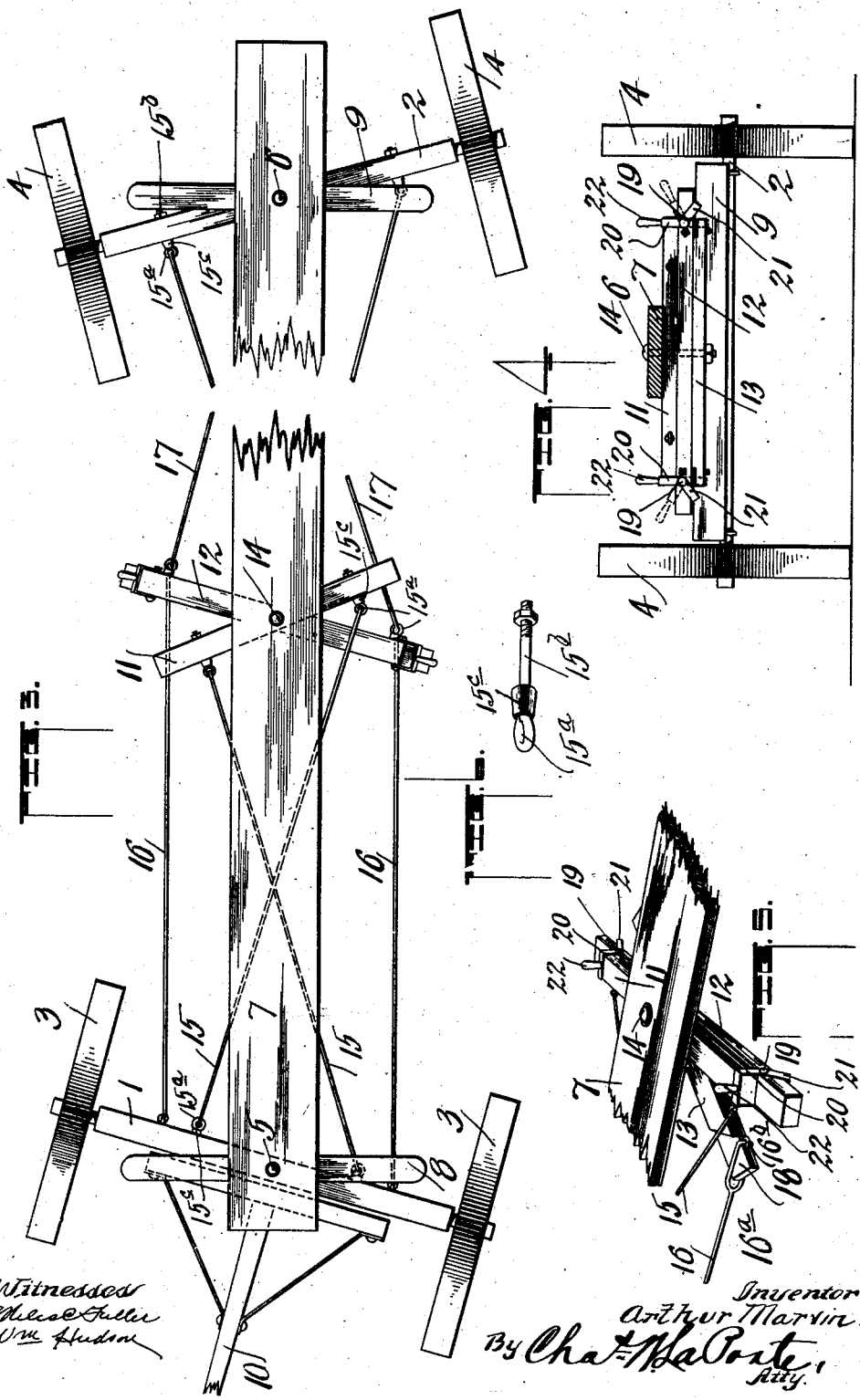

ARTHUR MARVIN, OF EL PASO, ILLINOIS.

TRUCK.

973,797.

Specification of Letters Patent.

Patented Oct. 25, 1910.

Application filed March 5, 1909. Serial No. 481,235.

*To all whom it may concern:*

Be it known that I, ARTHUR MARVIN, a citizen of the United States, residing at El Paso, in the county of Woodford and State of Illinois, have invented certain new and useful Improvements in Trucks; and I do hereby declare that the following is a full, clear, and exact description of the invention, which will enable others skilled in the art to which it appertains to make and use the same.

This invention has reference to certain new and useful improvements in trucks and loaders, and has special reference to the steering devices therefor.

One of the objects of the present invention is to provide a steering device for trucks and loaders, whereby when said devices are arranged in a certain manner and the front axle is turned, the rear axle will be correspondingly turned; but when said steering devices have been adjusted, in a manner in which they are capable of being adjusted, and said front axle is turned, the rear axle will be thrown into an opposite position, or that position which will cause the front and rear wheels to track.

With these and other ends in view which will readily appear as the nature of the invention is better understood, the same consists in the improved construction and novel arrangement and combination of parts which will be hereinafter fully described and particularly pointed out in the claims.

In the drawings Figure 1 is a plan view partly broken away illustrating the preferred form in which my invention has been embodied; the dotted lines showing how, when the steering devices are arranged in a certain manner and when the front axle is turned the rear axle will be swung in the same direction; Fig. 2 is a side elevation of Fig. 1, also partly broken away; Fig. 3 is a plan view partly broken away similar to Fig. 1, but in this figure the steering devices have been adjusted so that upon turning the front axle, the rear axle will be swung into an opposite position, or that position which will cause the front and rear wheels to track; Fig. 4 is a vertical sectional view as the same would appear if taken on the line 4—4 of Fig. 1, looking in the direction of the arrow in said figure; Fig. 5 is a perspective view showing in detail the devices which regulate the direction in which the rear axle will turn, when the front axle is operated, and Fig. 6 is a detail view showing the coupling for certain rods with parts of the steering mechanism and running gear.

Like numerals of reference indicate corresponding parts throughout the figures.

The front and rear axles constituting a part of the running gear from the truck are designated 1 and 2 carrying the ground wheels 3 and 4. These axles have a pivotal connection at 5 and 6 with the front and rear end of a reach or connecting bar or frame 7. With the construction of truck contemplated, this reach or connecting bar or frame 7 is intended to be of considerable length, possibly forty or fifty feet, although it may be more or less, making provision for the handling of extension feeders which are commonly used in connection with corn shellers, although the truck may be used for other and various purposes.

8 and 9 denote bolsters supported on the axles 1 and 2 and connected with each other and with the reach 7. In the preferred construction these bolsters are fixed relative to the swinging movement of their respective axles, and 10 is a tongue, which may be connected with the front axle 1 in any suitable and convenient manner.

Disposed transversely of the reach 7 and arranged in a superimposed manner intermediate the ends of the reach and preferably below said reach, are the steering bars or frames 11, 12 and 13. The bars or frames 11 and 13 being the upper and lower bars, respectively, while the bar or frame 12 is placed between the bars or frames 11 and 13, and somewhat longer, see Figs. 4 and 5. Said bars or frames 11, 12 and 13 are pivotally connected with each other and with the reach 7 by means of the king-bolt 14 or similar device. The upper bar or frame 11 is connected with the front axle 1 through the crossed steering-rods 15. The bar or frame 13, which is the lowermost bar of the series, is also connected with the front axle, but by the straight rods 16, arranged parallel and spaced upon opposite sides of the reach 7, while the intermediate bar or frame 12 is connected with the rear axle 2 through the crossed steering-rods 17. The crossed rods 15 are connected with the axle 1 and the upper bar or frame 11, by looping the ends of said rods through eyes $15^a$ of threaded rods $15^b$, which are secured to said axle and upper bar or frame, respectively. The eyes 15ª of the threaded rods 15ᵇ are spaced a suitable distance from the axle 1 and the bar or frame 11, by means of the spacing collars or sleeves 15ᶜ, through which said threaded rods 15ᵇ are carried, as shown in Figs. 3 and 6. A similar connection for the crossed rods 17 is made with the bar or frame 12 and the rear axle 2. The connection for the spaced and parallel rods 16 with the front axle 1 and the lower bar or frame 13, is slightly different: that is to say, the threaded rods 15ᵇ which serve as a means for connecting the rods 16 with the axle 1, are not provided with the collars or sleeves 15ᶜ, which will bring the eyes 15ª in juxtaposition to said axle, and instead of connecting said rods 16 to the bar or frame 13 by looping said rods through eyes of threaded stems, such as those indicated as 15ᵇ, the opposite ends of said bar or frame 13, are provided with the offset or cut-out portions 18, and the inner ends of said rods 16 are provided with elongated loops 16ª through which the reduced or offset ends of said bar or frame 13 are inserted, see Fig. 5, and staples 16ᵇ are employed for hingedly connecting the rods 16 with said bar or frame 13. It will be understood that unless some such arrangement is provided, such as I have just above described, for connecting the rods 15, 16 and 17 with the front axle and with the bars 11 and 13, and the rear axle with the bar 12, that in steering there would be liability for the parts to become cramped but with such a connection as I describe, this is entirely obviated.

I have provided means for locking, either the upper bar 11 to the intermediate bar 12, or the lower bar 13 to said bar 12, and when so arranged and locked, the parts will operate in the manner seen in dotted lines in Fig. 1, or as shown in full lines in Fig. 3. To accomplish this, I pivotally connect to the opposite ends of the bar 12, the switch arms 19; which said arms have the upper yoke portions 20 and the lower yoke portions 21, and each of said switch arms 19 have the hand-holds 22 to enable an operator to operate said switch arms for connecting the bar 12 to either the bar 11 or the bar 13. By making the bar 12 longer than the bars 11 and 13, I not only provide a suitable support for the switch arms 19 but in addition, the ends of the bar will limit the throw of the switch arms, as seen in Fig. 4. When the switch arms 19 are in the position seen in Fig. 4, locking the bar 12 to the bar 11 and turning the axle 1 to the right, as shown in dotted lines in Fig. 1, or to the left as the case may be, the crossed rods 15 will operate to swing the bar 12 so that it will operate the cross-rods 17 to swing the axle 2 in the same direction as the axle 1. When this is done, it is readily seen that the truck may be moved bodily laterally, or to or from the side of a building, as the case may be, which is very desirable under certain conditions. When it is desired to have the axles turn in the ordinary manner, with the use of the usual crossed-rods, or so that the front and rear wheels will track, as seen in Fig. 3, the switch arms 19 are thrown into the position seen in Fig. 4, which will lock the bar 12 to the bar 13. Now, then, when the front axle 1 is swung the rods 16 will operate to swing the bar 12 so that it will operate the cross-rods 17 to swing the axle 2 in just the opposite direction to the swing of the axle 1 whereby the front and rear wheels will assume a position similar to that seen in Fig. 3.

Having thus fully described my invention, what I claim and desire to secure by Letters Patent of the United States, is:—

1. In an apparatus of the character described, the combination of front and rear pivoted axles, a reach bar connecting said axles, a plurality of steering bars pivotally attached to said reach bar, steering connections between the front axle and certain of said steering bars, steering connections between the rear axle and certain other of said bars, and means for interchangeably locking certain of said steering bars together, whereby the rear axle may be caused to turn in the same general direction or in an opposite direction with said front axle.

2. In an apparatus of the character described, the combination of front and rear pivoted axles, a reach bar connecting said axles, a plurality of superimposed steering bars pivotally attached to said reach bar, crossed connections between the front axle and the upper steering bar, parallel and spaced rods connecting said front axle with the lower steering bar, crossed connections between the rear axle and the intermediate steering bar, and means for interchangeably locking the upper and lower steering bars with the intermediate bar, whereby the rear axle may be caused to turn in the same general direction or in an opposite direction with said front axle.

3. In an apparatus of the character described, the combination of front and rear pivoted axles, a reach bar connecting said axles, a plurality of superimposed steering bars arranged transversely to the reach bar and pivotally attached thereto, crossed steering connections between the front axle and one of said steering bars, a plurality of parallel and spaced steering rods between said front axle and one of the other of said steering bars, crossed steering connections between said rear axle and one of the other of said steering bars, and means for interchangeably locking certain of said steering bars together, whereby the rear axle may be caused to turn in the same general direction or in an opposite direction with said front axle.

4. In an apparatus of the character described, the combination of front and rear pivoted axles, a reach bar connecting said axles, a bar connected with said reach bar and steering connections between said front axle and said bar, a second bar also connected with said reach bar and connections between said front axle and said second bar, a third bar also connected with said reach bar and steering connections between said rear axle and said third bar, and means for interchangeably connecting the first and second bars with said third bar.

5. In an apparatus of the character described, the combination of front and rear pivoted axles, a member connecting said axles, three transverse bars one arranged above the other pivotally connected with said member, the intermediate of said three bars being longer than the other bars, connections between front and rear axles and certain of said transverse bars, and switch arms pivotally connected with the extensions of said intermediate bar for interchangeably connecting the upper and lower of said transverse bars with said intermediate bars.

In testimony whereof I affix my signature, in presence of two witnesses.

ARTHUR MARVIN.

Witnesses:
 CHAS. W. LA PORTE,
 LAURA E. CLAYPOOL.